(12) United States Patent
Lee et al.

(10) Patent No.: US 8,899,664 B2
(45) Date of Patent: Dec. 2, 2014

(54) CROSSMEMBER ASSEMBLY FOR VEHICLES

(75) Inventors: Un Koo Lee, Whasung-Si (KR); Sung Bae Jang, Whasung-Si (KR); Pil Young Jeong, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/561,349

(22) Filed: Jul. 30, 2012

(65) Prior Publication Data

US 2013/0147236 A1   Jun. 13, 2013

(30) Foreign Application Priority Data

Dec. 9, 2011   (KR) ........................ 10-2011-0132285

(51) Int. Cl.
  *B62D 25/08*   (2006.01)
(52) U.S. Cl.
  USPC ................. 296/193.01; 296/203.02; 296/204; 296/193.09
(58) Field of Classification Search
  CPC ............................... B62D 21/02; B62D 21/00
  USPC .................. 296/203.02, 193.09, 193.01, 204, 296/187.04
  IPC ....................................................... B62D 25/08
  See application file for complete search history.

(56) References Cited

U.S. PATENT DOCUMENTS 6,685,202 B2 *   2/2004   Fujimoto ............... 280/124.109

FOREIGN PATENT DOCUMENTS

| JP | 8-119151 A | 5/1996 |
|---|---|---|
| JP | 2005-119558 A | 5/2005 |
| JP | 2008-168792 A | 7/2008 |
| KR | 1998-032787 U | 9/1998 |
| KR | 10-0435681 B1 | 6/2004 |
| KR | 10-0456881 B1 | 11/2004 |
| KR | 10-0589155 B1 | 6/2006 |

* cited by examiner

*Primary Examiner* — Pinel Romain
(74) *Attorney, Agent, or Firm* — Morgan, Lewis & Bockius LLP

(57) ABSTRACT

A crossmember assembly for a vehicle may include an upper panel; a pair of lower panels assembled at a lower side of both end portions of the upper panel to form a first box, a center lower panel, a middle portion of which is assembled to a lower middle portion of the upper panel, and a front side lower arm mounting panel and a rear side lower arm mounting panel that are disposed at a lower front side and a lower rear side of the crossmember assembly, respectively, and mounted to the both end portions of the upper panel to house a lower arm.

8 Claims, 7 Drawing Sheets

US 8,899,664 B2

CROSSMEMBER ASSEMBLY FOR VEHICLES

CROSS-REFERENCE TO RELATED APPLICATION

The present application claims priority to Korean Patent Application No. 10-2011-0132285 filed in the Korean Intellectual Property Office on Dec. 9, 2011, the entire contents of which is incorporated herein for all purposes by this reference.

BACKGROUND OF THE INVENTION

1. Field of the Invention

The present invention relates to a crossmember assembly for a vehicle. More particularly, the present invention relates to a crossmember assembly for a vehicle that improves assembling characteristics with a drive portion for ARC (active roll control) and secures sufficient rigidity.

2. Description of Related Art

Generally, a crossmember assembly for a vehicle is a frame of a vehicle that is applied to a side member or an underbody, and is disposed in a width direction of a vehicle to prevent torsion or bending of the vehicle body by securing rigidity or strength.

FIG. 1 is a perspective view of a crossmember assembly for a vehicle according to a conventional art, and FIG. 2 is a side view of a crossmember assembly for a vehicle along the A direction of FIG. 1.

Referring to FIG. 1, a conventional crossmember assembly 100 includes an upper panel 101, two lower panels 103, and a center lower panel 105.

That is, the lower panel 103 is assembled at a lower side of both ends of the upper panel 101, and a center lower panel 105 is assembled at a lower middle portion of the upper panel 101.

Also, an assist arm bracket 107 is formed at a front side surface of both ends of the upper panel 101, and a stabilizer bar mounting bracket 109 is formed at the rear side surface of both ends.

Referring to FIG. 2, a reinforcement plate 111 is welded on a lower surface of an end portion of an inner side of the lower panels 103 so as to reinforce the rigidity of the lower panels 103 near each end portion of the center lower panel 105.

FIG. 3 is a one-side bottom view of a crossmember assembly for a vehicle for explaining a problem of a conventional art.

Referring to FIG. 3, because a conventional crossmember assembly for a vehicle 100 as described above has not enough space in the inner side of the lower panel 103, the assembling characteristic thereof is deteriorated by interference with a component such as a drive portion 200 for ARC, and it is hard to secure a mounting portion for the reinforcement plate 111, and therefore there is a drawback that it is hard to secure the rigidity of the lower panel 103.

Also, because the lower panel 103 is integrally formed with the lower arm mounting portion (M), it is hard to secure the rigidity, and there is a drawback that the forming characteristic and assembling characteristic are deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a crossmember assembly for a vehicle having advantages of improving an assembling characteristic and securing rigidity by assembling an upper panel and a lower panel in a double box shape and by making the lower panel cover a drive portion for ARC (active roll control) without interference.

Also, various aspects of the present invention are directed to providing a crossmember assembly for a vehicle having advantages of improving a forming characteristic and an assembling characteristic by applying a front/rear side lower arm mounting panel on the lower panel that is separated in a front/rear direction.

In an aspect of the present invention, a crossmember assembly for a vehicle, may include an upper panel, a pair of lower panels assembled at a lower side of both end portions of the upper panel to form a first box, a center lower panel, a middle portion of which is assembled to a lower middle portion of the upper panel, and a front side lower arm mounting panel and a rear side lower arm mounting panel that are disposed at a lower front side and a lower rear side of the crossmember assembly, respectively, and mounted to the both end portions of the upper panel to house a lower arm.

Each lower end portion of the front side lower arm mounting panel and the rear side lower arm mounting panel is covered by both distal end portions of the center lower panel to be fixed on the upper panel.

Each upper end portion of the front side lower arm mounting panel and the rear side lower arm mounting panel is connected to the upper panel and the lower panel to form a second box, wherein each lower end portion of the front side lower arm mounting panel and the rear side lower arm mounting panel is covered by both distal end portions of the center lower panel to be fixed on the upper panel.

The lower panel may have a seating portion that is formed at an inner side portion thereof and may have a curved surface to cover a drive portion for ARC (active roll control).

A stabilizer bar mounting bracket that may include upper and lower brackets is disposed on and fixed to a rear side surface of the both end portions of the upper panel, wherein one end of the upper bracket is connected to the upper panel and one end of the lower bracket is connected to the rear side lower arm mounting panel, wherein the other end of the upper bracket and the other end of the lower bracket are connected each other.

The lower bracket is made of an extruding material.

A pair of assist arm brackets is disposed at a front surface of the both end portions of the upper panel.

In an exemplary embodiment of the present invention, the inner side of the lower panel covers a drive portion for ARC without interference to improve an assembling characteristic, and an upper panel and a lower panel are assembled in a double box shape together with a front/rear side lower arm mounting panel to secure rigidity.

Also, a front/rear side lower arm mounting panel that is separated in a front/rear direction is applied on the lower panel to improve a forming characteristic and an assembling characteristic.

The methods and apparatuses of the present invention may have other features and advantages which will be apparent from or are set forth in more detail in the accompanying drawings, which are incorporated herein, and the following Detailed Description, which together serve to explain certain principles of the present invention.

Figure 1:
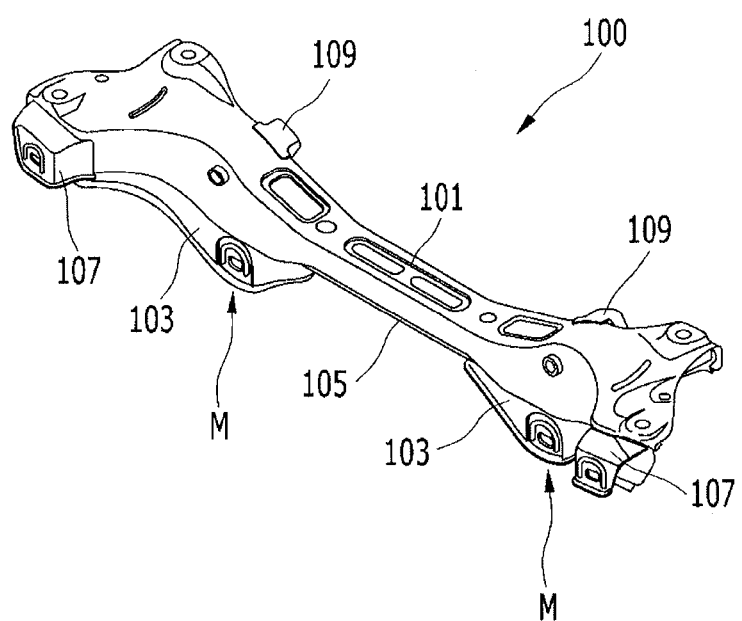
FIG. 1 is a perspective view of a crossmember assembly for a vehicle according to a conventional art.
Figure 2:
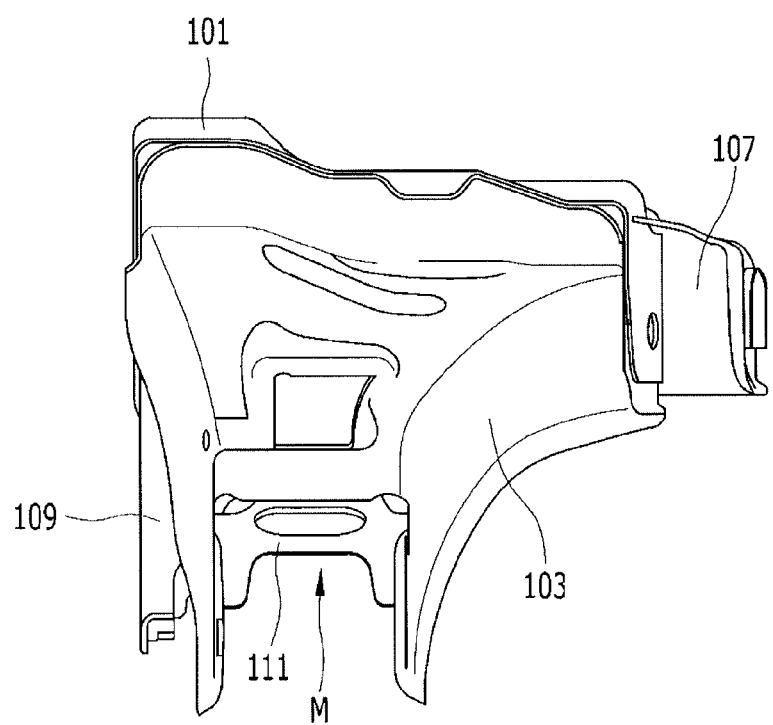
FIG. 2 is a side view of a crossmember assembly for a vehicle along the A direction of FIG. 1.
Figure 3:
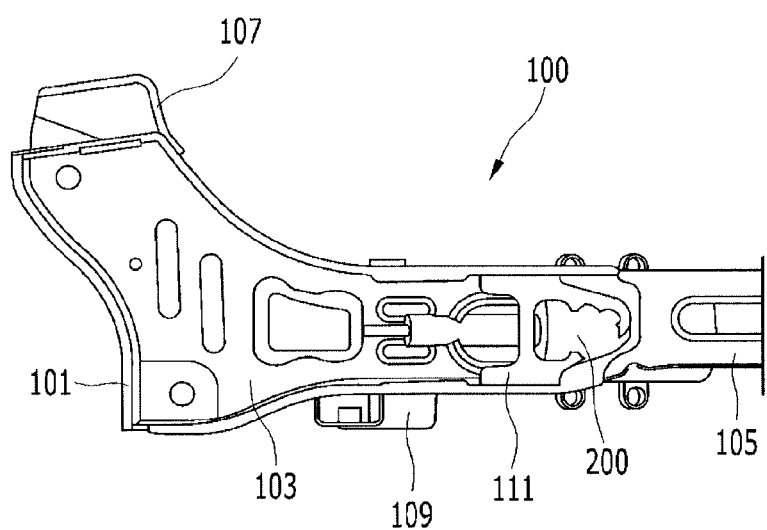
FIG. 3 is a one-side bottom view of a crossmember assembly for a vehicle for explaining a problem of a conventional art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, parts that are not related thereto will be omitted so as to clearly describe an exemplary embodiment of the present invention.

Figure 4:
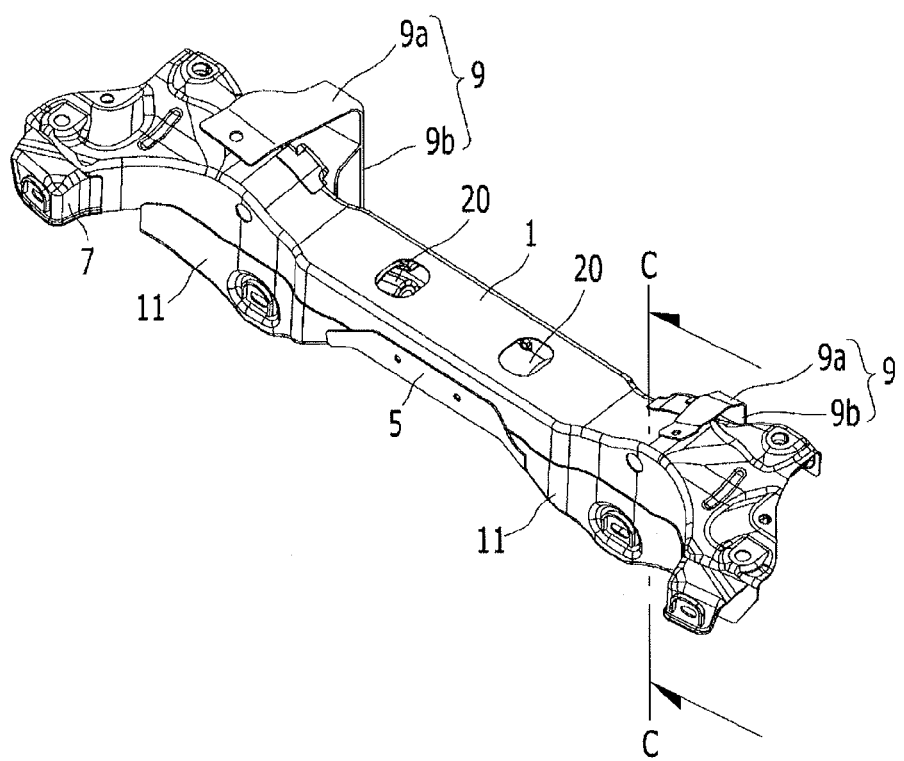
FIG. 4 is a perspective view of a crossmember assembly for a vehicle according to an exemplary embodiment of the present invention.
Figure 5:
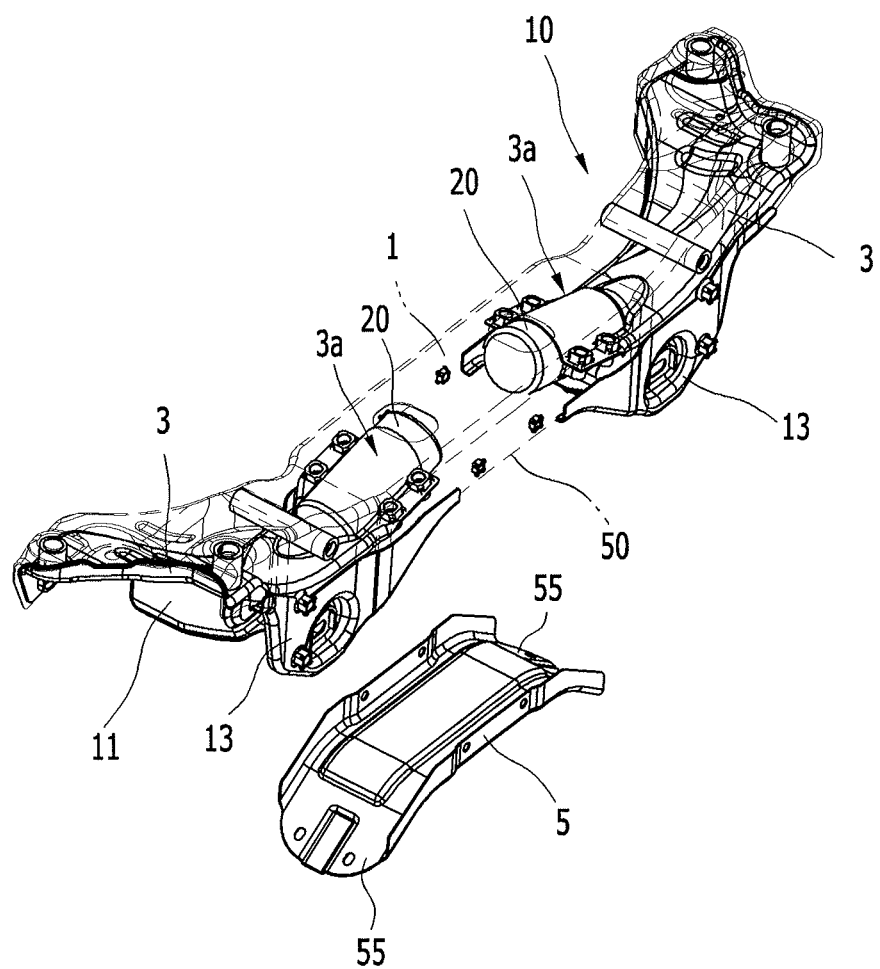
FIG. 5 is a transparent perspective view of a crossmember assembly for a vehicle according to an exemplary embodiment of the present invention.

FIG. 4 is a perspective view of a crossmember assembly for a vehicle according to an exemplary embodiment of the present invention, and FIG. 5 is a transparent perspective view of a crossmember assembly for a vehicle according to an exemplary embodiment of the present invention.

Referring to FIG. 4 and FIG. 5, a crossmember assembly 10 according to an exemplary embodiment of the present invention includes an upper panel 1, two lower panels 3, and a lower center panel 5.

The lower panels 3 are respectively assembled on a lower side of both ends of the upper panel 1.

Also, the center lower panel 5 is assembled on a lower middle portion 50 of the upper panel 1.

Also, an assist arm bracket 7 is disposed at a front surface of both end portions of the upper panel 1, and a stabilizer bar mounting bracket 9 is disposed at a rear surface of both end portions thereof.

Figure 6:
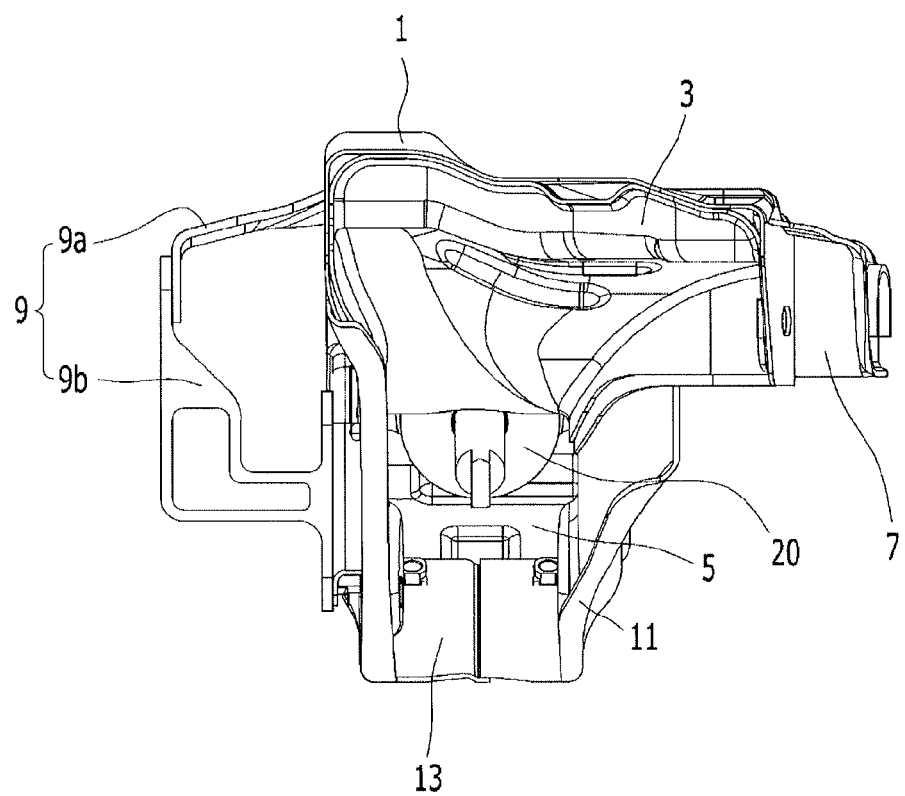
FIG. 6 is a side view of a crossmember assembly for a vehicle along the B direction of FIG. 4.

As shown in FIG. 6, a front side and a rear side lower arm mounting panel 11 and 13 that are respectively disposed at a front side and a rear side of a lower side thereof are disposed on the lower panel 3 to house a lower arm.

Figure 7:
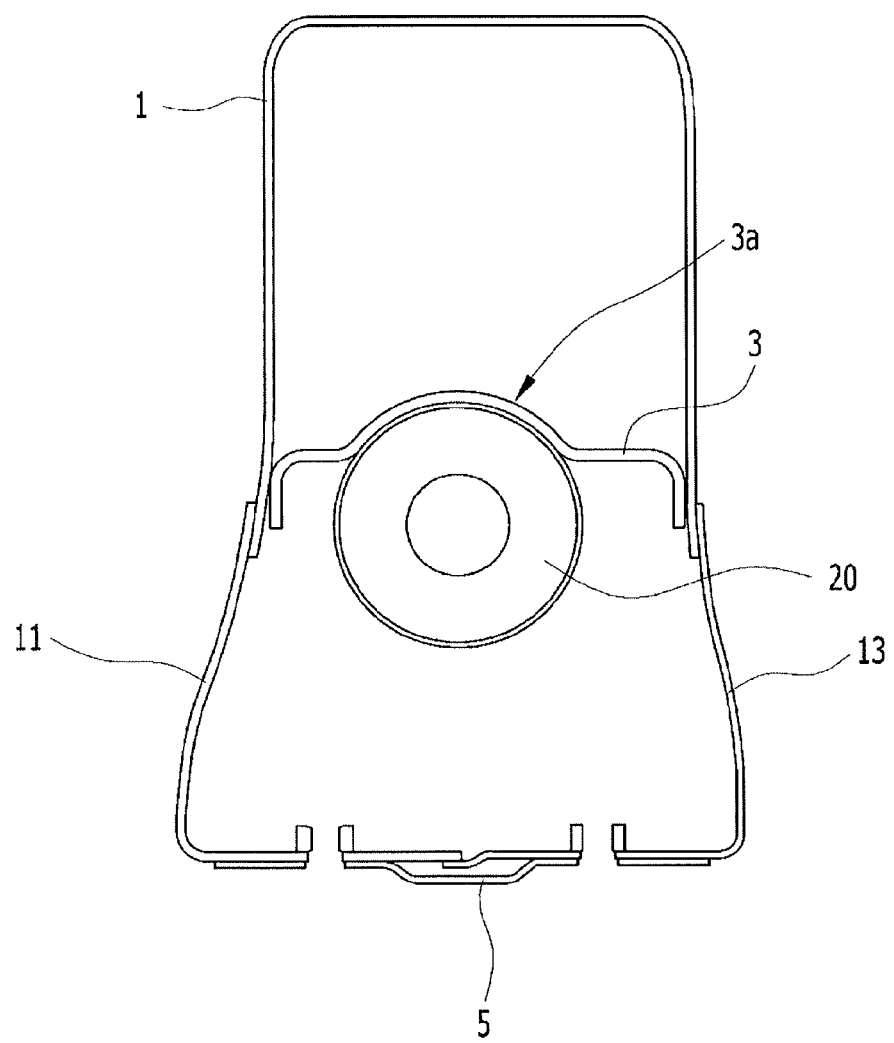
FIG. 7 is a cross-sectional view along line C-C of FIG. 4.

That is, as shown in FIG. 7, lower end portions of the front side and the rear side lower arm mounting panels 11 and 13 are connected to form a double box shape together with the upper panel 1 and the lower panel 3, wherein the double box shape has a structure in which one box is disposed on the other box.

In this structure, each inner end portion of the front side and rear side lower arm mounting panel 11 and 13 is covered by both end portions 55 of the center lower panel 5 to be fixed on the upper panel 1.

Also, a seating portion 3a is formed on the lower panel 3 to cover an upper portion of a drive portion 20 for ARC (active roll control).

Meanwhile, the stabilizer bar mounting bracket 9 that is respectively fixed on a front side of both end portions of the upper panel 1 includes upper and lower brackets 9a and 9b, wherein the lower bracket 9b can be made of an extruding material.

Accordingly, as described above, the crossmember assembly for a vehicle 10 has a stable double box shape in which the upper panel 1 and the lower panel 3 are assembled together with the front side and rear side lower arm mounting panels 11 and 13 to secure structural rigidity.

Also, the lower panel 3 has the seating portion 3a that is formed to cover the drive portion 20 for ARC without interference to improve an assembling characteristic.

Further, the lower arm is mounted on the lower panel 3 through the front side and rear side lower arm mounting panels 11 and 13 that are separated in a front/rear direction and therefore a forming characteristic by press forming is improved and an assembling characteristic between components is improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A crossmember assembly for a vehicle, comprising:
   an upper panel;
   a pair of lower panels assembled at a lower side of both end portions of the upper panel to form a first box;
   a center lower panel, a middle portion of which is assembled to a lower middle portion of the upper panel; and
   a front side lower arm mounting panel and a rear side lower arm mounting panel that are disposed at a lower front side and a lower rear side of the crossmember assembly, respectively, and mounted to the both end portions of the upper panel to house a lower arm;
   wherein a stabilizer bar mounting bracket that includes upper and lower brackets is disposed on and fixed to a rear side surface of the both end portions of the upper panel.

2. The crossmember assembly of claim 1, wherein each lower end portion of the front side lower arm mounting panel and the rear side lower arm mounting panel is covered by both distal end portions of the center lower panel to be fixed on the upper panel.

3. The crossmember assembly of claim 1, wherein each upper end of the front side lower arm mounting panel and the rear side lower arm mounting panel is connected to the upper panel and the lower panel to form a second box.

4. The crossmember assembly of claim 3, wherein each lower end portion of the front side lower arm mounting panel and the rear side lower arm mounting panel is covered by both distal end portions of the center lower panel to be fixed on the upper panel.

5. The crossmember assembly of claim 1, wherein the lower panel has a seating portion that is formed at an inner side portion thereof and has a curved surface to cover a drive portion for ARC (active roll control).

6. The crossmember assembly of claim 1, wherein one end of the upper bracket is connected to the upper panel and one end of the lower bracket is connected to the rear side lower arm mounting panel, wherein the other end of the upper bracket and the other end of the lower bracket are connected to each other.

7. The crossmember assembly of claim 1, wherein the lower bracket is made of an extruding material.

8. The crossmember assembly of claim 1, wherein a pair of assist arm brackets is disposed at a front surface of the both end portions of the upper panel.

* * * * *